(12) United States Patent
Asthana et al.

(10) Patent No.: US 10,387,987 B2
(45) Date of Patent: Aug. 20, 2019

(54) GRID-BASED WATERMARK

(71) Applicant: Hewlett-Packard Development Company, L.P., Houston, TX (US)

(72) Inventors: Prashant Asthana, Bangalore (IN); Rajesh Bhatia, Bangalore (IN); Bharani Nunna, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 49 days.

(21) Appl. No.: 15/534,056

(22) PCT Filed: Dec. 15, 2014

(86) PCT No.: PCT/US2014/070328
§ 371 (c)(1),
(2) Date: Jun. 8, 2017

(87) PCT Pub. No.: WO2016/099441
PCT Pub. Date: Jun. 23, 2016

(65) Prior Publication Data
US 2017/0345119 A1    Nov. 30, 2017

(51) Int. Cl.
*G06T 1/00* (2006.01)
*G06F 21/00* (2013.01)
*H04N 21/8358* (2011.01)

(52) U.S. Cl.
CPC .... *G06T 1/0071* (2013.01); *G06T 2201/0051* (2013.01); *G06T 2201/0061* (2013.01); *H04N 21/8358* (2013.01)

(58) Field of Classification Search
CPC .. H04N 21/00; G06T 2207/0061; G10L 19/00
(Continued)

(56) References Cited

U.S. PATENT DOCUMENTS 6,973,197 B2   12/2005 Miller
6,975,744 B2   12/2005 Sharma et al.
(Continued)

FOREIGN PATENT DOCUMENTS

CN       104182927      12/2014
WO       WO-02071685 A1   9/2002

OTHER PUBLICATIONS

Digimarc, "Digimarc Guardian for Images FAQ," Aug. 11, 2014, 19 pages, http://www.digimarc.com.
(Continued)

*Primary Examiner* — Abolfazl Tabatabai
(74) *Attorney, Agent, or Firm* — HP Inc. Patent Department (57) ABSTRACT

An example implementation includes an apparatus including a processor to divide a digital image into a grid including a first grid region and a second grid region. The processor is also to generate a first grid-based watermark using shared watermark information and a first set of grid coordinates associated with the first grid region. The processor is further to generate a second grid-based watermark using the shared watermark information and a second set of grid coordinates associated with the second grid region. The processor is further to embed the first grid-based watermark into a first region of the digital image corresponding to the first grid region and to embed the second grid-based watermark into a second region of the digital image corresponding to the second grid region. The processor is further to generate a machine-readable digital image including the embedded first grid-based watermark and the embedded second grid-based watermark.

15 Claims, 9 Drawing Sheets

(58) Field of Classification Search
USPC .......................................... 382/100; 713/176
See application file for complete search history.

(56) References Cited

U.S. PATENT DOCUMENTS

| | | | |
|---|---|---|---|
| 7,158,653 B2* | 1/2007 | Fletcher | G06T 1/0028 |
| | | | 382/100 |
| 7,602,936 B2* | 10/2009 | Wendt | G06T 1/0064 |
| | | | 358/3.28 |
| 7,945,781 B1 | 5/2011 | Rhoads | |
| 8,055,013 B2* | 11/2011 | Levy | G06K 7/12 |
| | | | 382/100 |
| 8,332,401 B2 | 12/2012 | Hull et al. | |
| 8,447,064 B2 | 5/2013 | Rhoads et al. | |
| 2003/0187798 A1 | 10/2003 | McKinley et al. | |
| 2006/0291690 A1 | 12/2006 | Roberts | |
| 2009/0310817 A1 | 12/2009 | Park et al. | |
| 2010/0027837 A1 | 2/2010 | Levy et al. | |

OTHER PUBLICATIONS

Digimarc, "Multiple Watermarks in One Image via the Digital Watermarking Photoshop Plug-In," (Youtube Presentation), Jun. 2, 2014,https://www.youtube.com/watch (no copy).

Digimarc, "The Digimarc Discover Advantage," (Brochure), 2013, 2 pages.

OrgPublisher, "OrgPublisher 11 User Guide,", Jul. 31, 2013, 369 pages, http://www.aquire.com/resources.

* cited by examiner

GRID-BASED WATERMARK

BACKGROUND

Watermarking is a process to place information into a medium. The medium may be a digital medium or a physical medium. In some examples, when a watermark is placed into a physical medium, the watermark may be invisible to human vision.

BRIEF DESCRIPTION OF THE DRAWINGS

Some examples of the present application are described with respect to the following figures.

DETAILED DESCRIPTION

As described above, watermarking is a process to place information into a medium. The information may be referred to as a watermark. In some examples, a watermark may be used to create a hotspot within a medium, such as a digital image. A hotspot may be a particular region of a medium that triggers a providing of particular information at an electronic device, such as a mobile device (e.g., a mobile phone), when detected by the electronic device. The particular information may be referred to as user payoff information. As an example, the user payoff information may include text, image, video, audio, a uniform resource locator (URL) of a website, or any other information. The mobile device may retrieve the user payoff information based on the watermark embedded in the hotspot.

In some examples, a hotspot may be a region of a digital image containing a feature that is of interest to viewers of the digital image, such as a hat or a fashion accessory. To embed a watermark into a region of the digital image to create a hotspot, the feature may be manually identified via human vision so that the location of the hotspot is determined. Thus, a design complexity of creating a hotspot may be increased.

Examples described herein provide an electronic device to embed grid-based watermarks into a digital image so that at least one hotspot may be created during the watermarking process without human intervention to identity the location (s) of the at least one hotspot. For example, an electronic device, such as a server computer, may divide a digital image into a grid including a first grid region and a second grid region. The first grid region may be associated with a first set of grid coordinates. The second grid region may be associated with a second set of grid coordinates. The electronic device may generate a first grid-based watermark using shared watermark information and the first set of grid coordinates. The electronic device may generate a second grid-based watermark based on the shared watermark information and based on the second set of grid coordinates. The electronic device may further embed the first grid-based watermark into a first portion of the digital image corresponding to the first grid and embed the second grid-based watermark into a second portion of the digital image corresponding to the second grid. The electronic device may generate a modified digital image including the embedded first grid-based watermark and the embedded second grid-based watermark.

An electronic device, such as mobile phone, may receive a machine-readable digital image that is embedded with a plurality of watermarks. The electronic device may extract a watermark of the plurality of watermarks from the machine-readable digital image. The electronic device may decode the watermark to determine a first grid coordinate and a second grid coordinate. The electronic device may further identify payoff information associated with a portion of the machine-readable digital image based on the first grid coordinate and based on the second grid coordinate. In this manner, examples described herein may reduce a design complexity of creating a hotspot.

Figure 1:
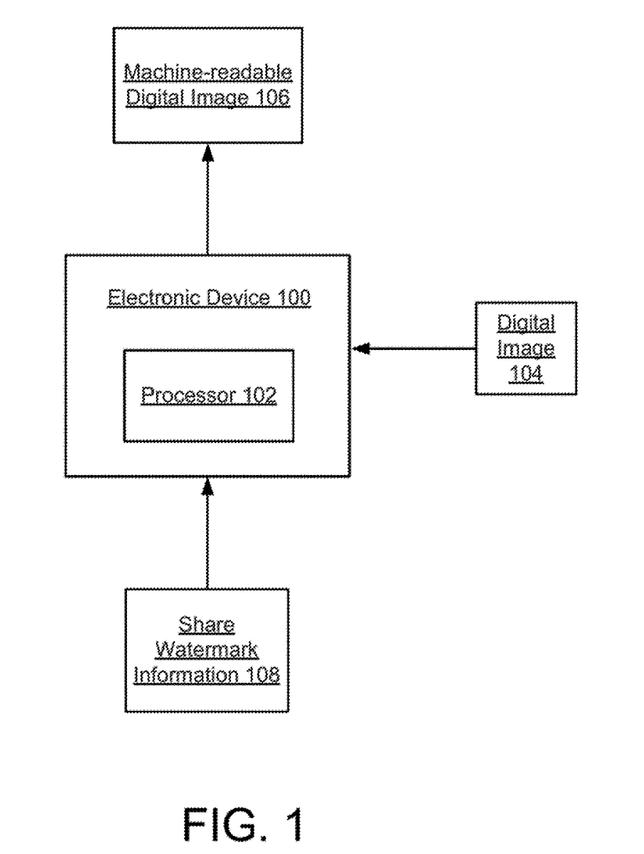
FIG. 1 is a block diagram of an electronic device to embed at least one grid-based watermark generated using shared watermark information and a set of grid coordinates into a digital image, according to an example.

FIG. 1 is a block diagram of an electronic device 100 to embed at least one grid-based watermark generated using shared watermark information and a set of grid coordinates into a digital image, according to an example. Electronic device 100, for example, may be, a web-based server, a local area network server, a cloud-based server, a notebook computer, a desktop computer, an all-in-one computer, a tablet, a mobile phone, or any electronic device suitable to embed a watermark into a digital medium. Electronic device 100 may include a processor 102 to control operations electronic device 100. Processor 102 may be, for example, a central processing unit (CPU), a semiconductor-based microprocessor, and/or other hardware devices suitable for retrieval and execution of instructions stored in a computer-readable storage medium (not shown in FIG. 1).

During operation, electronic device 100 may receive and/or generate a digital image 104. Digital image 104 may be data that is represented using pixels. In some examples, content of digital image 104 may be a digital representation of a physical object. Electronic device 100 may embed at least one grid-based watermark into digital image 104 to generate a machine-readable digital image 106. As described in more detail in FIG. 3, electronic device 100 may divide digital image 104 into a grid including a plurality of grid regions. Each of the plurality of grid regions may be associated with a set of distinct grid coordinates, such as an x-axis coordinate and a y-axis coordinate. Electronic device 100 may generate a distinct watermark for each of the plurality of grid regions. A watermark associated with a grid may be referred to as a grid-based watermark. A watermark may be machine-readable representation of data/information that is embedded in a medium. Electronic device 100 may generate a grid-based watermark associated with a grid using shared watermark information 108 and a grid coordinate associated with the grid. Shared watermark information 108 may be any watermark information suitable to be embedded into a digital medium. Each grid-based watermark may represent distinct grid-based watermark information. Examples of grid-based watermark information represented by a grid-based watermark are described in more detail in FIGS. 4A and 4B.

As described in more detail below, electronic device 100 may embed a distinct grid-based watermark into each of the plurality of grid regions so that a distinct hotspot may be created in each of the plurality of grid regions. For example, the plurality of grid regions may include a first grid region and a second grid region. The first grid region may be associated with a first set of grid coordinates, such as (0, 1), where "0" refers to an x-axis coordinate and "1" refers to a y-axis coordinate. The second grid region may be associated with a second set of grid coordinates. The first grid region may correspond to a first region of digital image 104 and the second grid region may correspond to a second region of digital image 104.

Electronic device 100 may generate a first grid-based watermark associated with the first grid region and a second grid-based watermark associated with the second grid region. Electronic device 100 may generate the first grid-based watermark using shared watermark information 108 and the first set of grid coordinates. Electronic device 100 may generate the second grid-based watermark using shared watermark information 108 and the second set of grid coordinates. Electronic device 100 may embed the first grid-based watermark into the first portion of digital image 104 and the second grid-based watermark into the second portion of digital image 104.

Figure 5A:
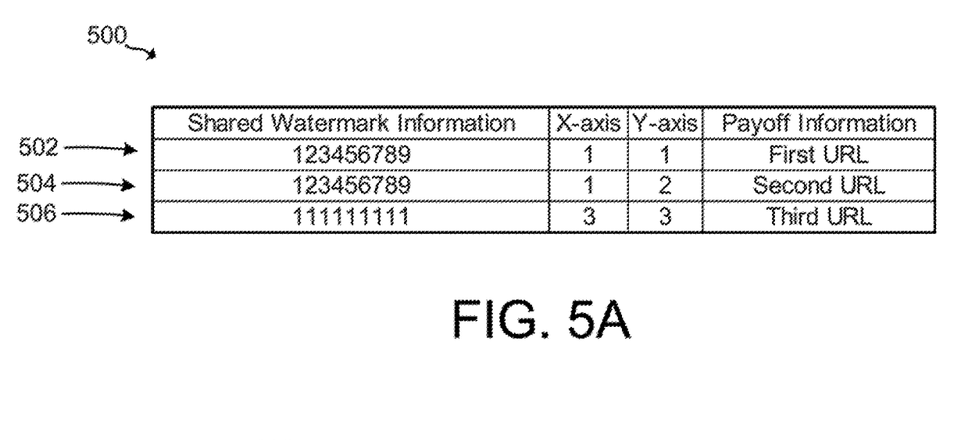
FIG. 5A is a lookup table of payoff information associated with at least one grid-based watermark generated using shared watermark information and a set of grid coordinates, according to an example.

Electronic device 100 may associate payoff information (e.g., text, image, video, audio, a URL of a website, etc.) with respective grid coordinates of the first grid and the second grid via a lookup table. An example lookup table is described in more detail in FIG. 5. After embedding the first grid-based watermark and the second grid-based watermark into digital image 104, machine-readable digital image 106 may be generated. Thus, machine-readable digital image 106 may include content of digital image 104, the first grid-based watermark, and the second grid-based watermark. In some examples, each embedded grid-based watermark of machine-readable digital image 106 may be used to create a distinct hotspot as described in more detail in FIG. 5. When machine-readable digital image 106 is distributed, either via electronic transmission or by physical transmission (e.g., printing out a copy of machine-readable digital image 106), embedded grid-based watermarks of machine-readable digital image 106, such as the first grid-based watermark and the second grid-based watermark, may also be distributed along with machine-readable digital image 106.

Figure 2:
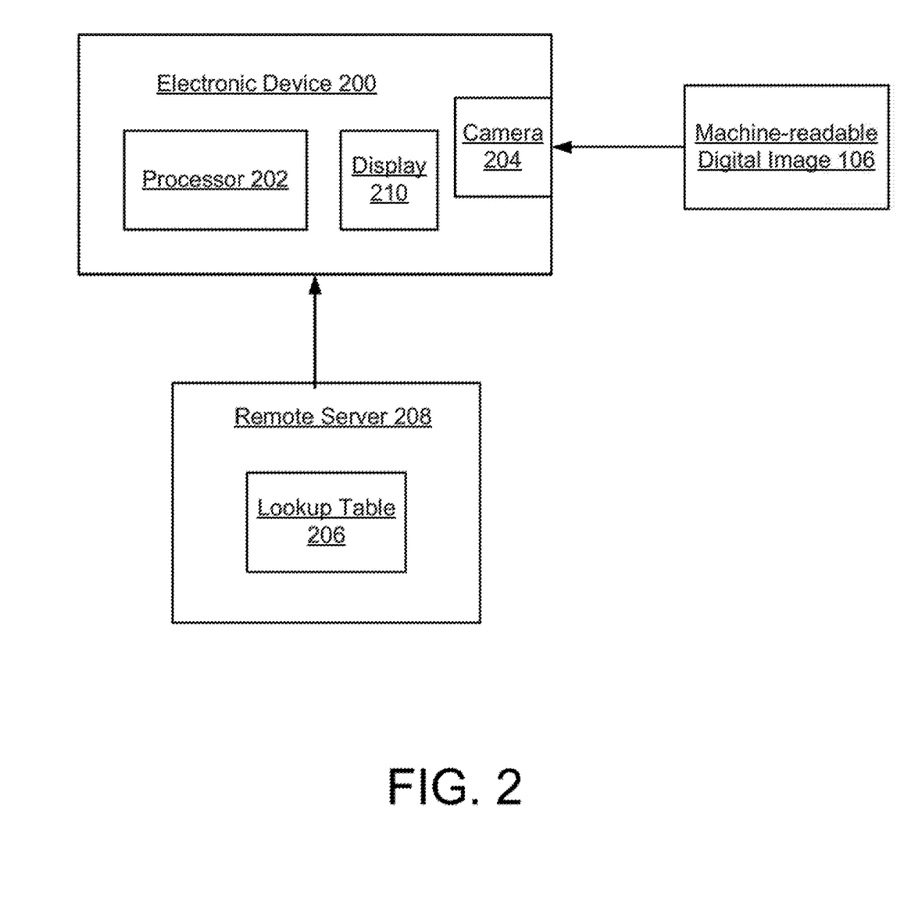
FIG. 2 is a block diagram of an electronic device to extract at least embedded grid-based watermark generated using shared watermark information and a set of grid coordinates from a digital image, according to an example.

FIG. 2 is a block diagram of an electronic device 200 to extract at least one embedded grid-based watermark generated using shared watermark information and a set of grid coordinates from a digital image, according to an example. Electronic device 200 may be similar to electronic device 100. Electronic device 200 may Include a processor 202 that is similar to processor 102. During operation, electronic device 200 may access machine-readable digital image 106 of FIG. 1 to extract the first grid-based watermark and/or the second grid-based watermark embedded in machine-readable digital image 106. For example, electronic device 200 may access machine-readable digital image 106 by scanning a physical copy of machine-readable digital image 106 via a scanning device, such as a camera 204 of electronic device 200. When electronic device 200 accesses hotspots of machine-readable digital image 106 (e.g., a first portion of machine-readable digital image 106 containing the first grid-based watermark and a second portion of machine-readable digital image 106 containing the second grid-based watermark), electronic device 200 may extract the first grid-based watermark and/or the second grid-based watermark from machine-readable digital image 106, for example, via a watermark extraction application implemented using processor executable instructions (not shown in FIG. 2).

Electronic device 200 may decode the first grid-based watermark and/or the second grid-based watermark to determine the respective set of grid coordinates. For example, electronic device 200 may decode the first grid-based watermark to determine the shared watermark information and the first set of grid coordinates. As another example, electronic device 200 may decode the second grid-based watermark to determine the shared watermark information and the second set of grid coordinates. Electronic device 200 may access a lookup table 206 that includes payoff information associated with each set of grid coordinates of machine-readable digital image 106 to identify the payoff information.

In some examples, lookup table 206 may be stored in a remote server 208, electronic device 200 may receive lookup table 206 from the remote server. Based on lookup table 206, electronic device 200 may provide the payoff information to a user, such as a user of electronic device 200. For example, based on lookup table 206, electronic device 200 may automatically open a web browser application implemented using processor executable instructions and use the web browser application to display content of a website on a display 210 of electronic device 200. As described in more detail in FIGS. 5A-5B, payoff information for each set of grid coordinates in lookup table 206 may be changed so that when machine-readable digital image 106 is accessed again subsequently, different payoff information may be provided when the hotspots are accessed. In some examples, remote server 208 may store a plurality of lookup tables. Each distinct lookup table in remote server 208 may be identified by distinct shared watermark information. Thus, electronic device 200 may retrieve lookup table 206 by using shared watermark information determined from the first grid-based watermark and/or the second grid-based watermark.

Figure 3:
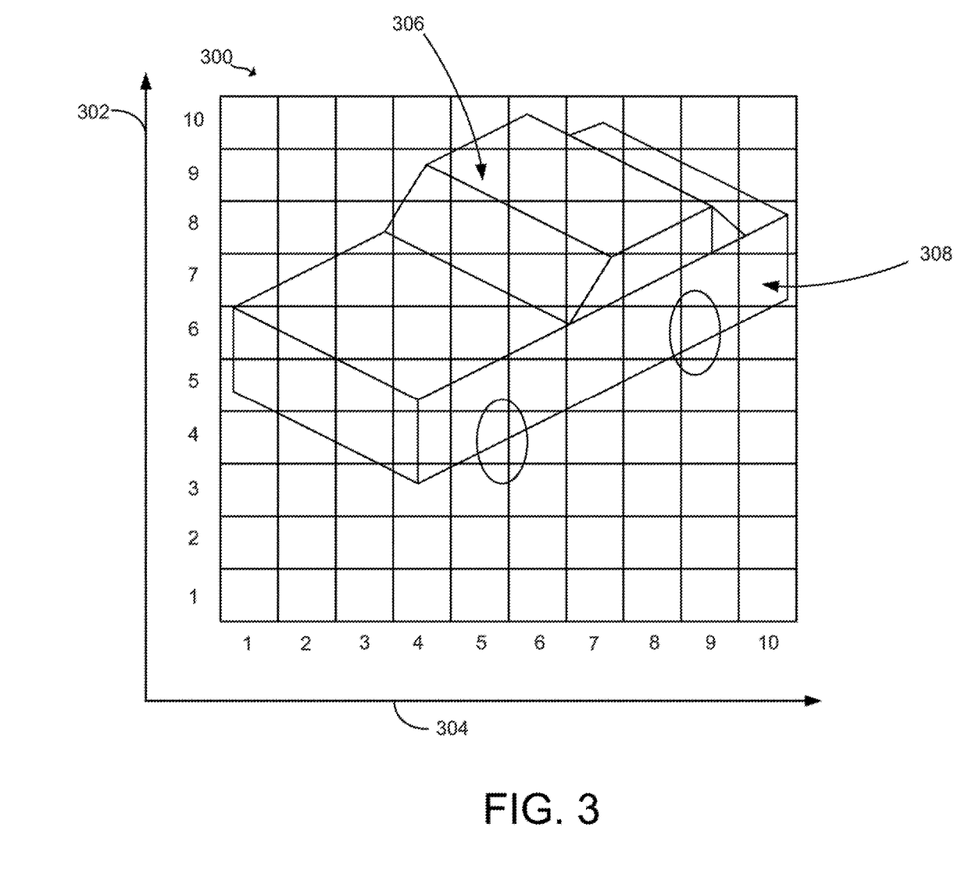
FIG. 3 is a diagram of a digital image divided into a grid including a plurality of grid regions, according to an example.

FIG. 3 is a diagram a digital image 300 divided into a grid including a plurality of grid regions, according to an example. Digital image 300 may be an example of digital image 104. In some examples, digital image 300 may be a digital image of a car. As illustrated in FIG. 3, digital image 300 may be divided into a two dimensional grid including a plurality of grid regions. Thus, each grid may be associated with a first set of grid coordinates from a first axis 302 and a second axis 304. First axis 302 may correspond to an x-axis and second axis 304 may correspond to a y-axis. As an example, a first grid region 306 may be associated with a first set of grid coordinates (9, 5). The grid coordinate "9" may be the x-axis coordinate and the grid coordinate "5" may be the y-axis coordinate. As another example, a second grid region 308 may be associated with a second set of grid coordinates (7, 10). Each of the plurality of grid regions may be embedded with a distinct grid-based watermark, for example, via electronic device 100 of FIG. 1, to create a distinct hotspot.

Figure 4A:
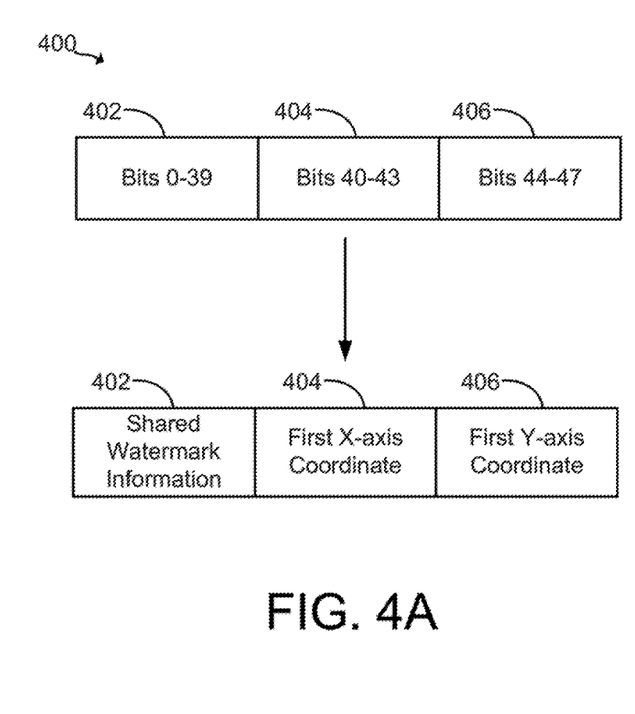
FIG. 4A is a diagram of grid-based watermark information represented by a grid-based watermark generated using shared watermark information and a set of grid coordinates, according to an example.

FIG. 4A is a diagram of grid-based watermark information represented by a grid-based watermark generated using shared watermark information and a set of grid coordinates, according to an example. First grid-based watermark information 400 is illustrated in FIG. 4A. First grid-based watermark information 400 may be represented by a grid-based watermark of machine-readable digital image 106 of FIG. 1 and/or a grid-based watermark to be embedded in digital image 300 of FIG. 1. In some examples, first grid-based watermark information 400 may be represented by a grid-based watermark to be embedded in first grid region 306 of FIG. 3.

First grid-based watermark information 400 may include a first portion 402, a second portion 404, and a third portion 406. First portion 402 may correspond to shared watermark information, such as shared watermark information 108. Second portion 404 may correspond to a first grid coordinate, such as an x-axis coordinate of first grid region 306. Third portion 406 may correspond to a second grid coordinate, such as a y-axis coordinate of first grid region 306. In some examples, first grid-based watermark information 400 may be 48-bit data. Bits 0-39 of first grid-based watermark information 400 may be first portion 402. Bits 40-43 of first grid-based watermark information 400 may be second portion 404. Bits 44-47 of first grid-based watermark information 400 may be third portion 406.

Figure 4B:
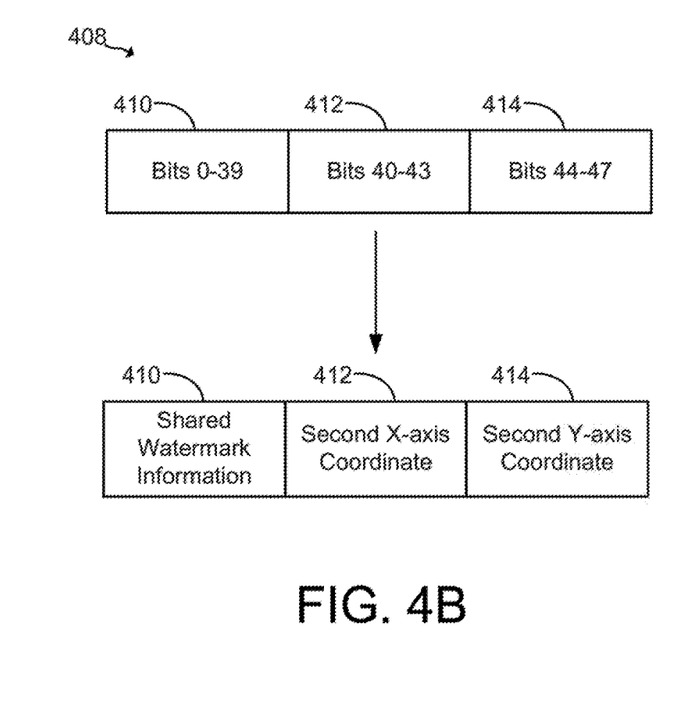
FIG. 4B is a diagram of grid-based watermark information represented by a grid-based watermark generated using shared watermark information and a set of grid coordinates, according to another example.

FIG. 4B is a diagram of grid-based watermark information represented by a grid-based watermark generated using shared watermark information and a set of grid coordinates, according to another example. Second grid-based watermark information 408 is illustrated in FIG. 4B. Second grid-based watermark information 408 may be represented by a grid based watermark of machine-readable digital image 106 of FIG. 1 and/or a grid-based watermark to be embedded in digital image 300 of FIG. 1. In some examples, second grid-based watermark information 408 may be represented by a grid-based watermark to be embedded in second grid region 308 of FIG. 3. Second grid-based watermark information 408 may include a fourth portion 410, a fifth portion 412, and a sixth portion 414. Fourth portion 410 may correspond to the shared watermark information, such as shared watermark information 108 of FIG. 1. Fifth portion 412 may correspond to a third grid coordinate, such as an x-axis coordinate of second grid region 308. Sixth portion 414 may correspond to a fourth grid coordinate, such as a y-axis coordinate of second grid region 308. In some examples, second grid-based watermark information 408 may be 48-bit data. Bits 0-39 of second grid-based watermark information 408 may be fourth portion 410. Bits 40-43 of second grid-based watermark information 408 may be fifth portion 412. Bits 44-47 of second grid-based watermark information 408 may be sixth portion 414.

FIG. 5 is a lookup table 500 of payoff information associated with at least one grid-based watermark generated using shared watermark information and a set of grid coordinates, according to an example. In some examples, lookup table 500 may implement lookup table 206 of FIG. 2. Each entry of lookup table 500 may be used to associate payoff information with a distinct grid-based watermark. As an example, a first entry 502 of lookup table 500 may indicate that first payoff information is associated with first grid-based watermark information 400 of FIG. 4A that is represented by a grid-based watermark. The first payoff information may be a first URL of a website. First grid-based watermark information 400 may be identified based on shared watermark information used to generate the particular grid-based watermark and/or a set of coordinates used to generate the particular grid-based watermark.

As an example, shared watermark information "123456789" in first entry 502 may correspond to first portion 402 of first grid-based watermark information 400 in decimal value. An x-axis coordinate "1" in first entry 502 may correspond to second portion 404 of first grid-based watermark information 400 in decimal value. A y-axis coordinate "1" in first entry 502 may correspond to third portion 406 of first grid-based watermark information 400 in decimal value. Thus, the first payoff information may be identified based on the shared watermark information in first entry 502, the x-axis coordinate in first entry 502, the y-axis coordinate in first entry 502, or any combination thereof.

As another example, a second entry 504 of lookup table 500 may indicate second payoff information that is associated with second grid-based watermark information 408 of FIG. 2. The second payoff information may be a second URL of a website. Shared watermark information "123456789" in second entry 504 may correspond to fourth portion 410 of second grid-based watermark information 408 in decimal value. An x-axis coordinate "1" in second entry 504 may correspond to fifth portion 412 of second grid-based watermark information 408 in decimal value. A y-axis coordinate "2" in second entry 504 may correspond to sixth portion 414 of second grid-based watermark information 408 in decimal value. Thus, the second payoff information may be identified based on the shared watermark information in second entry 504, the x-axis coordinate in second entry 504, the y-axis coordinate in second entry 504, or any combination thereof In some examples, when a special shared watermark information is used to generate a grid-based watermark, grid coordinates of the grid-based watermark may be ignored during the process to identify payoff information. For example, a third entry 506 of lookup table 500 may indicate that third payoff information is associated with particular grid-based watermark information represented by a grid-based watermark. The third payoff information may be a third URL of a website. Shared watermark information "111111111" in third entry 506 may be a special shared watermark information. Thus, when an electronic device decodes the grid-based watermark to determine the shared watermark information "111111111", the electronic device may identify the third payoff using the shared watermark information "111111111" irrespective of the x-axis coordinate and the y-axis coordinate. Thus, a time associated with identifying payoff information may be reduced. The special shared watermark information may be used, for example, when single payoff information is associated with grid-based watermarks in all hotspots of a digital image.

In some examples, payoff information in each entry of lookup table 500 may be modified after the corresponding entry is generated. For example, a first electronic device, such as electronic device 100 of FIG. 1, may generate first entry 502 during a first time period to associate the first payoff information with first grid-based watermark information 400. The first time period may be, when first grid-based watermark information 400 is generated. During a second time period that is subsequent to the first time period, the first electronic device or another electronic device may update first entry 502 to disassociate the first payoff information with first grid-based watermark information 400 and to associate the third payoff information with first grid-based watermark information 400. For example, the first electronic device or another electronic device may erase the first payoff information from first entry 502 and add the third payoff information to first entry 502. Thus, when an electronic device decodes first grid-based watermark information 400 after first entry 502 is updated, the third payoff information may be provided via the electronic device instead of the first payoff information.

In some examples, the first electronic device may generate portion of first entry 502 that includes the shared watermark information, the x-axis coordinate, and the y-axis coordinate when first grid-based watermark information 400 is generated. The first electronic device or another device may add payoff information to first entry 502 during a subsequent time period.

Figure 5B:
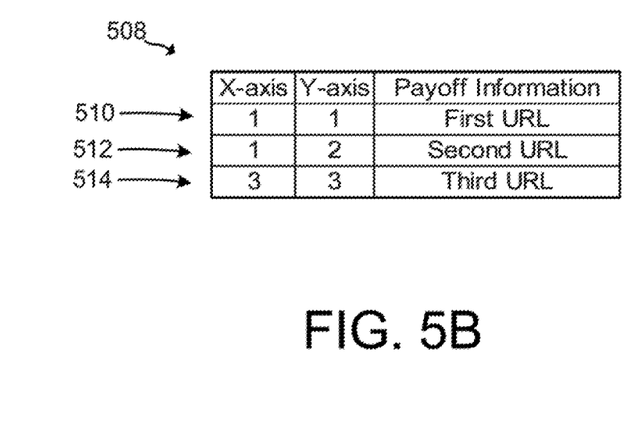
FIG. 5B is a lookup table of payoff information associated with at least one grid-based watermark generated using shared watermark information and a set of grid coordinates, according to another example.

FIG. 5B is a lookup table 508 of payoff information associated with at least one grid-based watermark generated using shared watermark information and a set of grid coordinates according to another example. Lookup table 508 may include a plurality of entries, such as a first entry 510, a second entry 512, and a third entry 514. Each entry of lookup table 508 may include grid coordinates and associated payoff information.

Lookup table 508 may be associated with particular shared watermark information. Thus, when lookup table 508 is retrieved, the particular shared watermark information may be used to identify lookup table 508. For example, when electronic device 200 of FIG. 2 determines from a grid-based watermark that the shared watermark information associated with the grid-based watermark is "123456789", electronic device 200 may use the shared watermark information "123456789" to identify an associated lookup table, such as lookup table 608. Electronic device 200 may use grid coordinates determined from the grid-based watermark to identify associated payoff information in the associated lookup table.

Figure 6:
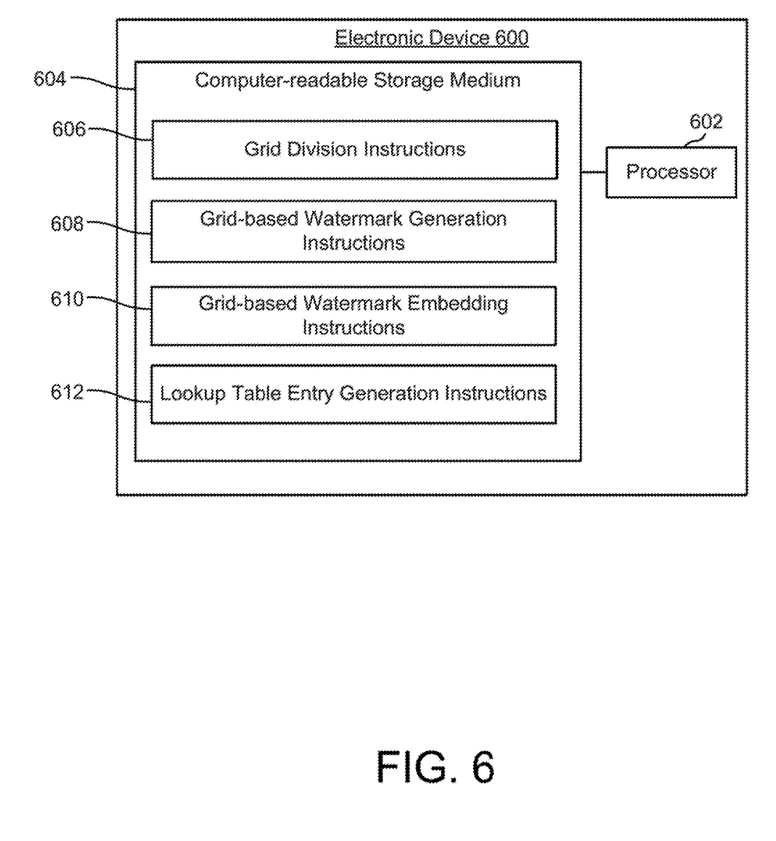
FIG. 6 is a block diagram of an electronic device to embed at least one grid-based watermark generated using shared watermark information and a set of grid coordinates into a digital image, according to an example.

FIG. 6 is a block diagram of an electronic device 600 to embed at least one grid-based watermark generated using shared watermark information and a set of grid coordinates into a digital image, according to an example. Electronic device 800 may implement electronic device 100 of FIG. 1. Electronic device 600 may include a processor 602 and a computer-readable storage medium 604.

Processor 602 may be a central processing unit (CPU), a semiconductor-based microprocessor, and/or other hardware devices suitable for retrieval and execution of instructions stored in computer-readable storage medium 604. Processor 602 may fetch, decode, and execute instructions 606-612 to control a process of generating and embedding at least one grid-based watermark into a digital image. As an alternative or in addition to retrieving and executing instructions, processor 602 may include at least one electronic circuit that includes electronic components for performing the functionality of instructions 606, 608, 610, 612, or a combination thereof.

Computer-readable storage medium 604 may be any electronic, magnetic, optical, or other physical storage device that contains or stores executable instructions. Thus, computer-readable storage medium 604 may be, for example, Random Access Memory (RAM), an Electrically Erasable Programmable Read-Only Memory (EEPROM), a storage device, an optical disc, etc. In some examples, computer-readable storage medium 604 may be a non-transitory storage medium, where the term "non-transitory" does not encompass transitory propagating signals. As described in detail below, computer-readable storage medium 604 may be encoded with a series of processor executable instructions 606-612 for generating and embedding at least one grid-based watermark into a digital image.

Grid division instructions 606 may divide a digital image, such as digital image 104 of FIG. 1, into a grid including a plurality of grid regions. Grid-based watermark generation instructions 608 may generate at least one grid-based watermark, such as first grid-based watermark information 400 of FIG. 4 or second grid-based watermark information 408, based on shared watermark information and based on a set of grid coordinates.

Grid-based watermark embedding instructions 610 may embed at least one grid-based watermark into an associated grid, such as first grid region 306 of FIG. 3 or second grid region 308. Lookup table entry generation instructions 612 may generate an entry or a portion of an entry into a lookup table to associate payoff information with a grid-based watermark.

Figure 7:
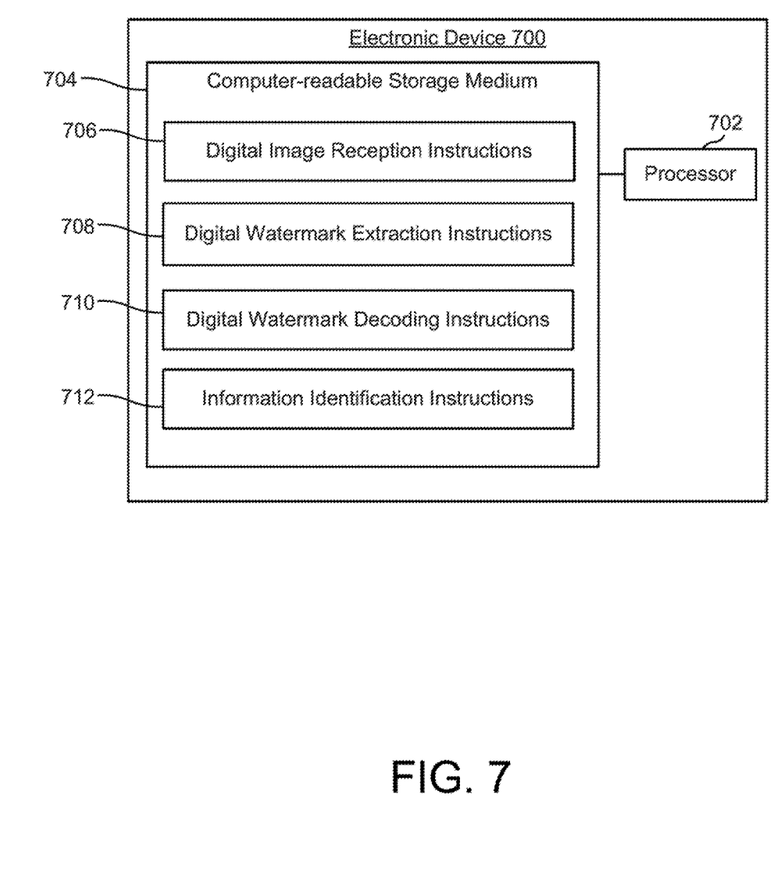
FIG. 7 is a block diagram of an electronic device to extract at least one embedded grid-based watermark generated using shared watermark information and a set of grid coordinates from a digital image, according to an example.

FIG. 7 is a block diagram of an electronic device 700 to extract at least one embedded grid-based watermark generated using shared watermark information and a set of grid coordinates from a digital image, according to an example. Electronic device 700 may implement electronic device 200 of FIG. 2. Electronic device 700 may include a processor 702 and a computer-readable storage medium 704. Processor 702 may be similar to processor 602 of FIG. 6. Computer-readable storage medium 704 may be similar to computer-readable storage medium 604 of FIG. 6. Processor 702 may fetch, decode, and execute instructions 706-712 to control a process of identifying payoff information based on an extracted grid-based watermark.

Digital image reception instructions 706 may receive a digital image that is embedded with at least one grid-based watermark, such as machine-readable digital image 106 of FIGS. 1-2, at electronic device 700. Digital watermark extraction instructions 708 may extract at least one grid-based watermark embedded in a digital image.

Digital watermark decoding instructions 710 may decode at least one grid-based watermark to determine shared watermark information and a set of coordinates associated with the at least one extracted grid-based watermark, such as shared watermark information 108 and the set of grid coordinates of first grid region 306. Payoff information identification instructions 712 may identify payoff information associated with a grid based watermark via a lookup table, such as lookup table 500 of FIG. 5.

Figure 8:
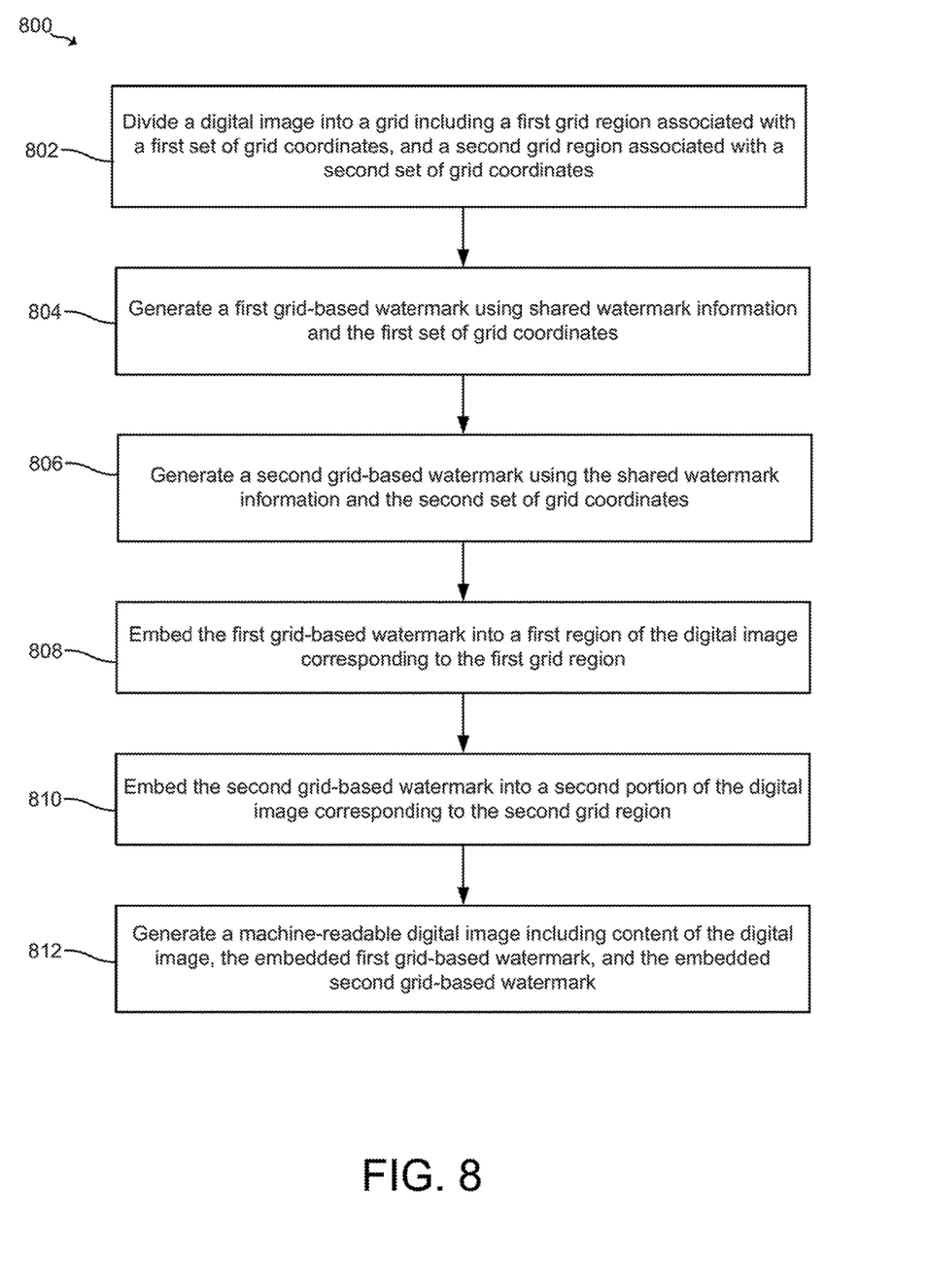
FIG. 8 is a flowchart illustrating a method of embedding at least one grid-based watermark generated using shared watermark information and a set of grid coordinates into a digital image, according to an example.

FIG. 8 is a flowchart illustrating a method 800 of embedding, at least one grid-based watermark generated using shared watermark information and a set of grid coordinates into a digital image, according to an example. Method 800 may be implemented using electronic device 100 of FIG. 1 and/or electronic device 800 of FIG. 6. Method 800 includes divide a digital image into a grid including a first grid region associated with a first set of grid coordinates, and a second grid region associated with a second set of grid coordinates, at 802. For example, referring to FIG. 1, electronic device 100 may divide digital image 104 into a grid. Method 800 also includes generating a first grid-based watermark using shared watermark information and the first set of grid coordinates, at 804, and generating a second grid-based watermark based on the shared watermark information and based on the second set of grid coordinates, at 806. For example, referring to FIG. 1, electronic device 100 may generate a distinct watermark for each of the plurality of grid regions.

Method 800 further includes embedding the first grid-based watermark into a first region of the digital image corresponding to the first grid region, at 808, and embedding the second grid-based watermark into a second region of the digital image corresponding to the second grid region, at 810. For example, referring to FIG. 1, electronic device 100 may embed the first grid-based watermark into the first region of digital image 104 and the second grid-based watermark into the second region of digital image 104.

Method 800 further includes generate a machine-readable digital image including content of the digital image, the embedded first grid-based watermark, and the embedded second grid-based watermark, at 812. For example, referring to FIG. 1, after embedding the first grid-based watermark and the second grid-based watermark into digital image 104, machine-readable digital image 106 may be generated. Thus, machine-readable digital image 106 may include content of digital image 104, the first grid-based watermark, and the second grid-based watermark.

Figure 9:
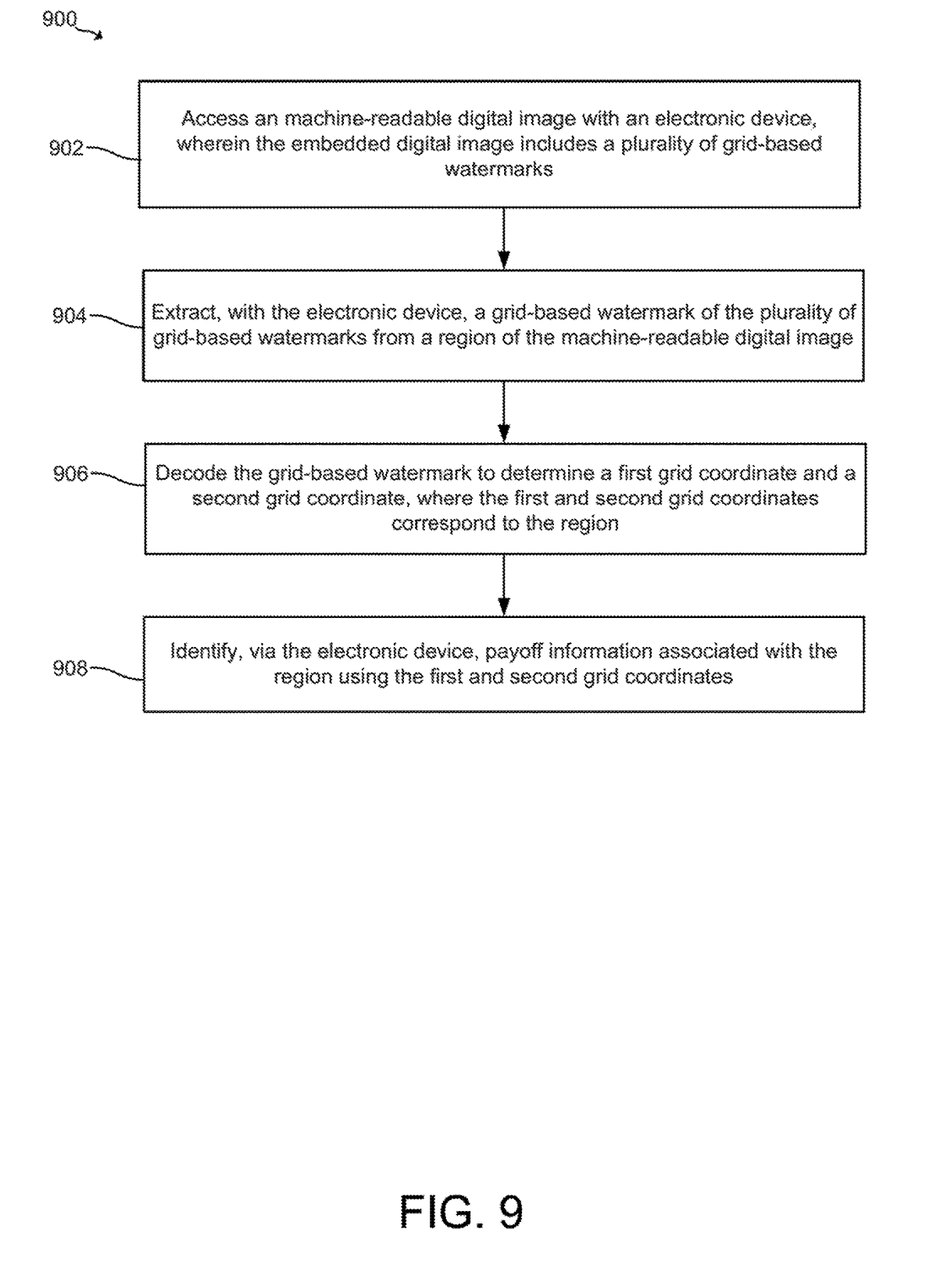
FIG. 9 is a flowchart illustrating a method of extracting at least one embedded grid-based watermark generated using shared watermark information and a set of grid coordinates from a digital image, according to an example.

FIG. 9 is a flowchart illustrating a method 900 of extracting at least one embedded grid-based watermark generated using shared watermark information and a set of grid coordinates from a digital image, according to an example. Method 900 may be implemented using electronic device 200 of FIG. 2 and/or electronic device 700 of FIG. 7. Method 900 includes accessing a machine-readable digital image with an electronic device, where the machine-readable digital image includes a plurality of grid-based watermarks, at 902. For example, referring to FIG. 2, electronic device 200 may access machine-readable digital image 106 by scanning a physical copy of machine-readable digital image 106 via a scanning device, such as a camera 204 of electronic device 200.

Method 900 also includes extracting, with the electronic device, a grid-based watermark of the plurality of grid-based watermarks from a region of the machine-readable digital image, at 904. For example, referring to FIG. 2, electronic device 200 may extract the first grid-based watermark and/or the second grid-based watermark from machine-readable digital image 106, for example, via a watermark extraction application implemented using processor executable instructions (not shown in FIG. 2).

Method 900 further includes decoding the grid-based watermark to determine a first grid coordinate and a second grid coordinate, where the first and second grid coordinates correspond to the region, at 906. For example, referring to FIG. 2, electronic device 200 may decode the first grid-based watermark and/or the second grid-based watermark to determine the respectively set of grid coordinates.

Method 900 further includes identifying, via the electronic device, payoff information associated with the region using the first and second grid coordinates, at 908. For example, referring to FIG. 2, electronic device 200 may access a lookup table 206 that includes payoff information associated with each set of grid coordinates of machine-readable digital image 106 to identify the payoff information.

The use of "comprising", "including" or "having" are synonymous and variations thereof herein are meant to be inclusive or open-ended and do not exclude additional unrecited elements or method steps.

What is claimed is:

1. An apparatus comprising:
a processor to:
divide a digital image into a grid including a first grid region associated with a first set of grid coordinates and a second grid region associated with a second set of grid coordinates;
generate a first grid-based watermark using shared watermark information and the first set of grid coordinates;
generate a second grid-based watermark using the shared watermark information and the second set of grid coordinates;
embed the first grid-based watermark into a first region of the digital image corresponding to the first grid region;
embed the second grid-based watermark into a second region of the digital image corresponding to the second grid region; and
generate a machine-readable digital image including content of the digital image, the embedded first grid-based watermark, and the embedded second grid-based watermark.

2. The apparatus of claim 1, the processor is further to associate the first grid-based watermark with payoff information in a lookup table using the shared watermark information and the first set of grid coordinates subsequent to the generation of the machine-readable digital image.

3. The apparatus of claim 1, wherein the first set of grid coordinates includes a first grid coordinate and a second grid coordinate, wherein the first grid-based watermark corresponds to first grid-based watermark information including a first portion, a second portion, and a third portion, wherein the first portion corresponds to the shared watermark information, wherein the second portion corresponds to the first grid coordinate, and wherein the third portion corresponds to the second grid coordinate.

4. The apparatus of claim 3, wherein the second set of grid coordinates includes a third grid coordinate and a fourth grid coordinate, wherein the second grid-based watermark corresponds to second grid-based watermark information including a fourth portion, a fifth portion, and a sixth portion, wherein the fourth portion corresponds to the shared watermark information, wherein the fifth portion corresponds to the third grid coordinate, and wherein the sixth portion corresponds to the fourth grid coordinate.

5. The apparatus of claim 1, the processor further to:
associate, during a first time period, the first grid-based watermark with first payoff information in a lookup table using the shared watermark information and the first set of grid coordinates; and
associate the second grid-based watermark with second payoff information in the lookup table using the shared watermark information and the second set of grid coordinates.

6. The apparatus of claim 5, the processor further to:
disassociate the first grid-based watermark with the first payoff information during a second time period subsequent to the first time period; and
associate the first grid-based watermark with third payoff information.

7. A method comprising;
accessing an machine-readable digital image with an electronic device, wherein the machine-readable digital image includes a plurality of grid-based watermarks;

extracting, with the electronic device, a grid-based watermark of the plurality of grid-based watermarks from a region of the machine-readable digital image;

decoding the grid-based watermark to determine a first grid coordinate and a second grid coordinate, wherein the first and second grid coordinates correspond to the region; and identifying, via the electronic device, payoff information associated with the region using the first, and second, grid coordinates.

8. The method of claim 7, further comprising:

decoding the grid-based watermark to determine shared watermark information; and determining a lookup table associated with the grid-based watermark using the shard watermark information.

9. The method of claim 7, further comprising:

decoding the grid-based watermark to determine shared watermark information; and identifying the payoff information using the first grid coordinate, the second grid coordinate, and the shared watermark information.

10. The method of claim 9, wherein the grid-based watermark corresponds grid-based watermark information including a first portion, a second portion, and a third portion, wherein the shared watermark information is determined from the first portion, wherein the first grid coordinate is determined from the second portion, and wherein the second grid coordinate is determined from the third portion.

11. The method of claim 7, further comprising:

extracting, at the electronic device, a second grid-based watermark of the plurality of grid-based watermarks from a second region of the machine-readable digital image;

decoding the second grid-based watermark to determine a third grid coordinate and a fourth grid coordinate, wherein the third and fourth grid coordinates correspond to the second region; and identifying second payoff information associated with the second region using the third and fourth grid coordinates.

12. A non-transitory computer-readable storage medium comprising instructions that when executed cause a processor of an electronic device to:

divide a digital image into a grid including a first grid region associated with a first set of grid coordinates and a second grid region associated with a second set of grid coordinates;

generate a first grid-based watermark using shared watermark information and the first set of grid coordinates;

generate a second grid-based watermark using the shared watermark information and he second set of grid coordinates;

embed the first grid-based watermark into the first grid region of the digital image;

embed the second grid-based watermark into the second grid region of the digital image; and associate the first grid region with payoff information using the shared watermark information and the first set of grid coordinates.

13. The non-transitory computer-readable storage medium of claim 12, wherein the instructions when executed further cause the processor to associate the second grid with second payoff information different from the payoff information using the shared watermark information and the second set of grid coordinates.

14. The non-transitory computer-readable storage medium of claim 12, wherein the instructions when executed further cause the processor to associate the first grid with second payoff information using the shared watermark information and the first set of grid coordinates, wherein the second payoff information is different from the payoff information.

15. The non-transitory computer-readable storage medium of claim 12, wherein the payoff information corresponds to a uniform resource locator of a website.

\* \* \* \* \*

UNITED STATES PATENT AND TRADEMARK OFFICE
CERTIFICATE OF CORRECTION

PATENT NO.       : 10,387,987 B2  
APPLICATION NO.  : 15/534056  
DATED            : August 20, 2019  
INVENTOR(S)      : Prashant Asthana et al.

Page 1 of 1

It is certified that error appears in the above-identified patent and that said Letters Patent is hereby corrected as shown below:

In the Claims

In Column 10, Line 64, Claim 7, delete "comprising;" and insert -- comprising: --, therefor.

In Column 11, Line 9, Claim 7, delete "first," and insert -- first --, therefor.

In Column 11, Line 9, Claim 7, delete "second," and insert -- second --, therefor.

In Column 12, Line 13 (approx.), Claim 12, delete "he" and insert -- the --, therefor.

Signed and Sealed this
Nineteenth Day of November, 2019

Andrei Iancu
*Director of the United States Patent and Trademark Office*